US006697623B1

(12) United States Patent
Munk

(10) Patent No.: US 6,697,623 B1
(45) Date of Patent: Feb. 24, 2004

(54) SPEECH SIGNAL TRANSMISSION

(75) Inventor: Herbert Georg Munk, Coventry (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/619,165

(22) Filed: Dec. 9, 1997

Related U.S. Application Data

(63) Continuation of application No. 08/385,278, filed on Feb. 8, 1995, which is a continuation-in-part of application No. 07/971,967, filed as application No. PCT/GB92/01132 on Jun. 22, 1992, now abandoned.

(30) Foreign Application Priority Data

| Jun. 21, 1991 | (GB) | .............................................. 9113515 |
| Jun. 9, 1992 | (GB) | ................................ PCT/GB92/01131 |

(51) Int. Cl.[7] .............................................. H04Q 7/20
(52) U.S. Cl. ...................................... 455/445; 455/461
(58) Field of Search ................................ 455/445, 422, 455/11.1, 555, 461, 422.1, 550, 560, 403

(56) References Cited

U.S. PATENT DOCUMENTS

| 4,748,655 A | * | 5/1988 | Thrower et al. | ............. 455/461 |
| 5,168,498 A | * | 12/1992 | Adams et al. | ............... 455/445 |
| 5,305,308 A | * | 4/1994 | English et al. | ............... 370/335 |
| 5,412,760 A | * | 5/1995 | Peitz | ......................... 370/329 |
| 5,608,779 A | * | 3/1997 | Lev et al. | .................... 455/436 |
| 5,949,775 A | * | 9/1999 | Rautiola et al. | ............. 370/338 |
| 6,104,928 A | * | 8/2000 | Waugh | ........................ 455/445 |
| 6,122,510 A | * | 9/2000 | Granberg | ..................... 455/433 |
| 6,128,505 A | * | 10/2000 | Sipila | ......................... 455/465 |
| 6,134,439 A | * | 10/2000 | Sipila et al. | ................. 455/436 |
| 6,167,271 A | * | 12/2000 | Parker et al. | ............... 455/445 |
| 6,400,712 B1 | * | 6/2002 | Phillips | ....................... 370/355 |

FOREIGN PATENT DOCUMENTS

| WO | WO 93/00778 | * | 1/1993 | ............ H04Q/7/04 |

* cited by examiner

*Primary Examiner*—Nay Maung
*Assistant Examiner*—Edan Orgad
(74) *Attorney, Agent, or Firm*—Kirschstein, et al.

(57) ABSTRACT

In the transmission of speech in mobile telephone services where mobile handsets cooperate with a base station via a radio link, the base station being connected to a mobile switching center which, in turn, is connected to a public network, communication between the handsets and base stations is achieved using a standard selected to minimize bandwidth utilization. Sample standards are GSM and DECT. It has currently been proposed that in utilizing either of these standards a number of encoded speech channels will be multiplexed at the A interface between the base station and the MSC. The multiplex signal would then be converted to a 64 kb/s format at the interface between the MSC and the public network to which the MSC is connected. This proposal has a number of disadvantages. To alleviate these disadvantages it is proposed that conversion to the 64 kb/s format should be avoided if the recipient node can reconstitute the speech directly from its encoded format and that to such recipient nodes the encoded speech is sent in packetized form.

6 Claims, 1 Drawing Sheet

SPEECH SIGNAL TRANSMISSION

CROSS REFERENCE TO RELATED APPLICATION

This application is a continuation of U.S. patent application Ser. No. 08/385,278, filed Feb. 8, 1995, which, in turn, is a continuation-in-part of U.S. patent application Ser. No. 07/971,967, filed Apr. 12, 1993 now abandoned, which is a 371 of PCT/GB92/01132 filed Jun. 22, 1992.

BACKGROUND OF THE INVENTION

The present invention concerns the transmission of speech and is particularly concerned with mobile telephone services. The basic format for a network for mobile speech services will comprise the actual mobile handsets, a base station with which the handsets communicate via a radio link, a mobile switching center (MSC) connected to the base station, and a public network, possibly including the PSTN, to which the MSC is connected. There will, of course, normally be many handsets associated with each base station, and each MSC will be linked to a number of base stations.

There has been an explosive growth in the provision of mobile telephone services in the United Kingdom and this growth is likely to be limited more by the available radio spectrum rather than by saturated demand. This is because telephone terminals are increasingly being connected to their respective networks by radio links. Whether the intention is to provide the user with unrestricted mobility (mobile service), or merely to give the user the freedom of a restricted range of movement (cordless phone), the technical requirements have in common the need to restrict the use of bandwidth on the radio path in order to accommodate large numbers of users.

In an attempt to maximize the use of available bandwidth two emerging standards have been proposed. These standards are known respectively as GSM and DECT. GSM stands for Group Speciale Mobile and DECT stands for Digital European Cordless Telephony and is a standard being developed by ETSI.

GSM achieves its efficiency at the air interface by taking a short sample of speech and analyzing it and then sending data which will allow this burst to be reconstituted. The DECT standard proposed by ETSI has a very similar format. It has currently been proposed that in utilizing either of these two standards a number of encoded speech channels will be multiplexed at the A interface between the base station and the mobile switching center (MSC). The multiplexed signal would then be converted to a 64 kb/s format at the interface between the MSC and the public network to which the MSC is connected.

There are a number of drawbacks to this proposal. Firstly, in order to carry it out, conversion equipment will be required at entry to and exit from the fixed network. This conversion equipment will almost certainly have to be from a common pool. Secondly, there will be a time delay of around 100 ms per round trip due to the requirement for decoding and subsequent encoding. Thirdly, the trunk network loses the bandwidth advantage of the GSM coding.

SUMMARY OF THE INVENTION

The present invention is concerned with alleviating the above mentioned disadvantages.

Accordingly, from a first aspect the present invention comprises a speech transmission network having a plurality of nodes where transmission between certain of the nodes is via a predetermined telephony standard. The network comprises a plurality of mobile stations capable of receiving and transmitting over radio links speech which has been analyzed to provide data strings of a predetermined length from which the speech signal can be reconstituted, a base station for communicating with the mobile stations over the radio links and with a mobile switching center, and an interface between each base station and the mobile switching center at which the individual data strings are packetized for transmission across the communication network to another node without conversion to the predetermined telephony standard if the recipient node can reconstitute the speech directly from the data strings.

In accordance with a feature of the invention where the recipient node is not capable of reconstituting the speech from the data strings, conversion to the predetermined telephony standard will be carried out at the most appropriate point in the data network.

DETAILED DESCRIPTION OF THE PREFERRED EMBODIMENT

Figure 1:
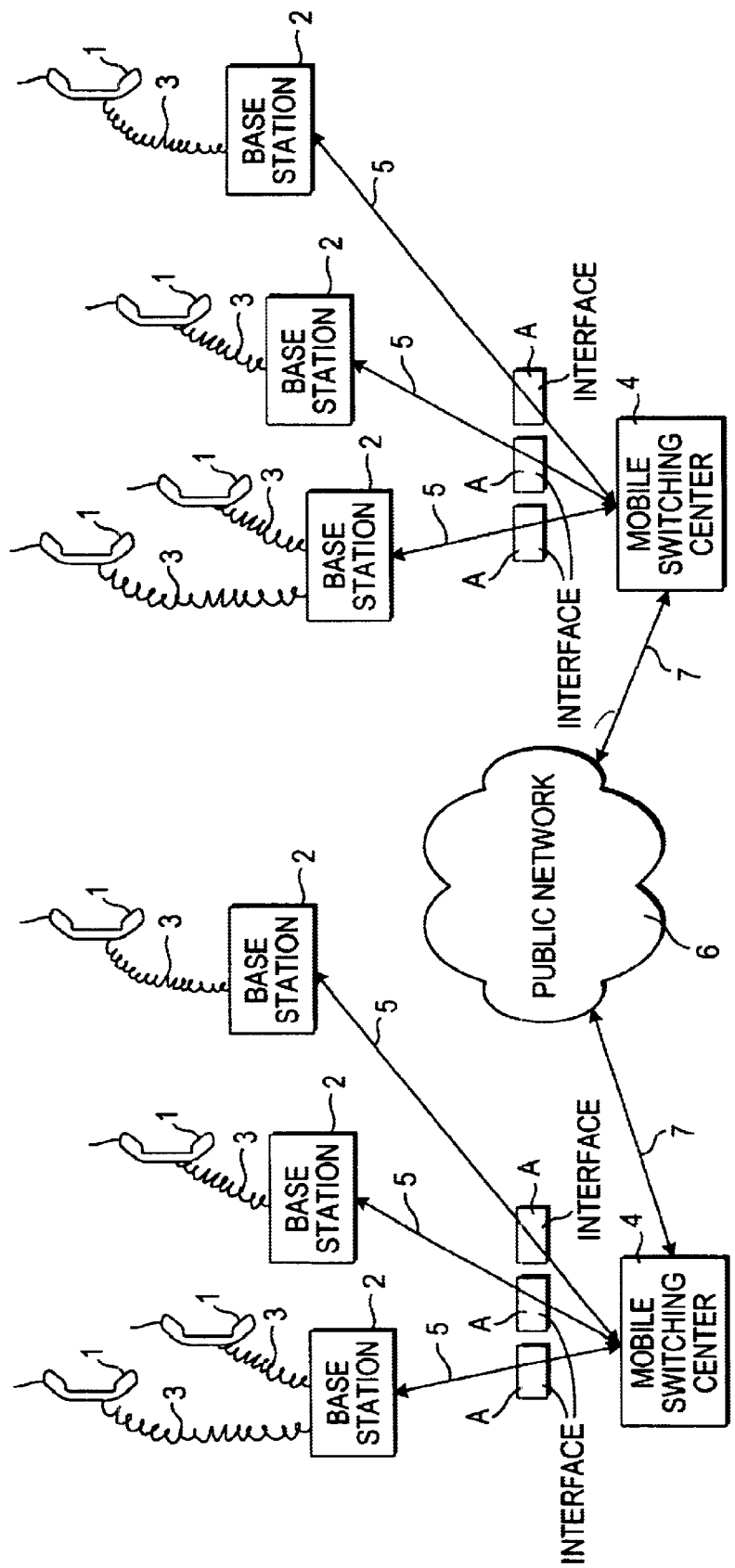
FIG. 1 of the accompanying drawing is a simple diagram showing the relationship between a cordless telephone and a public network.

Referring now to the single figure of the drawing, FIG. 1 shows a plurality of mobile stations each in the form of a cordless telephone 1 associated with a base station 2 over a radio link indicated at 3. Each base station 2 is connected to a mobile switching center (MSC) 4 via a link 5 and the mobile switching center (MSC) 4 is in turn connected to a public network 6 via a link indicated at 7. It will be appreciated that many more base stations 2 than those illustrated would in normal instances be connected to the mobile switching center 4. The public network 6 will have a plurality of nodes to which the speech data will be transmitted, and the MSC 4 provides one of these nodes. It is anticipated that the public network 6 will be at least partly capable of operating what is known as asynchronous transfer mode or ATM. In ATM, capacity is allocated on demand to different users in fixed amounts called "cells". The emerging standard for this service specifies a payload of 48 bytes of information per cell.

For the purpose of the present description it will be assumed that communication between each cordless telephone 1 and the base station 2 utilizes the standard known as GSM. This standard operates by taking a 20 ms sample of speech and analyzing it to form data strings. Each of these strings is in the form of 267 bits (including Cyclic Redundancy Check bits (CRC)). Each such string allows the short 20 ms burst of speech to be reconstituted. As already mentioned, the current proposal for a GSM network is to multiplex a number of encoded speech channels at the A interface between each base station and the mobile switching center and then to convert to a known telephony standard at the interface between the MSC and the public network 6. In the present embodiment this standard has a 64 kb/s format.

However, the present invention proposes that since the speech data encoded in accordance with GSM is of a quantity and form that would fit comfortably into an ATM cell, the conversion to a continuous bit stream, and in particular the conversion to 64 kb/s format, should be performed only when the capabilities of the network to be used make it essential. This is a contradistinction from what has already been proposed.

Accordingly, in the embodiment shown in FIG. 1, the link 5 between the base station 2 and mobile switching center 4 is operated as an ATM link and the data strings produced by the GSM coding are packetized into an ATM format. An advantage of this arrangement is that by using either add/drop multiplexers, or a metropolitan area network (MAN), preferably using DQDB protocol, a string of base stations such as base station 2 could all be connected very efficiently to the mobile switching center.

It will also be appreciated that any operator of a mobile network will wish to maximize his handling of the traffic. Thus, he will hand over calls destined for the fixed network as near as possible to the destination. Where both parties to a call are directly connected to his network he will obviously want to complete the whole call. Traffic of this kind will thus pass directly between linked mobile switching centers. Thus, the proposal to avoid automatic conversion to a 64 kb/s format will enable this traffic to be handled efficiently in its GSM coded form for which ATM is eminently suitable. Where there are a number of different mobile operators it will be necessary for them to reach agreement to avoid unnecessary conversions to and from the 64 kb/s format and to use ATM bridges between their networks.

The proposal is particularly advantageous if a call from a mobile station can be recognized at call set-up time as terminating on another mobile. This would require a small addition to the repertoire of the emerging signalling standards. Thus, where a GSM or other coded signal call is being set, it will be necessary for the signalling protocol to identify the call as such. There are a number of very great advantages to be gained in keeping the speech in its encoded form throughout wherever this is possible. These are:

1) Avoiding the use of conversion equipment (from a common pool) at entry to and exit from the fixed network.
2) Saving the time delay of a decode and subsequent encode (of the order of 100 ms round trip).
3) Using only a fraction of the bandwidth on the trunk portion of the call.
4) Good fit to ATM infrastructure, without needing special measures to fill cells.

In telecommunications signalling systems defined by standards of the International Consultative Committee for Telegraphs and Telephones (CCITT) such as Digital Subscriber Signalling No. 1 (DSS1) for access and Signalling System No. 7 (SS7) for trunks, which have been international standards for some years, parameters which are passed from end to end enable a process of negotiation to achieve the maximum functionality that both ends can support. In CCITT Standard Q931 (the relevant part of DSS1) they are called Bearer Capability, Low Layer Compatibility and High Layer Compatibility. DSS1—Recommendations Q.930–Q.940 being published at the IX. Plenary Assembly of CCITT at Melbourne, Nov. 14–25, 1988.

Q.931 referring to Bearer capability says that the bearer capability information element contains only information which may be used by the network.

The high layer compatibility information element provides means for use by a remote user for compatibility checking. The low layer compatibility information element is used for compatibility checking by an addressed entity (e.g., a remote user or an interworking unit) and may be transferred transparently between the calling user and the addressed entity and between the addressed entity and the calling user.

This information may include whether conversion to the telephony standard is necessary.

In some networks the originating and terminating exchanges hold sufficient information about end-users, so that only the trunk signalling systems need have such capability.

In cases where the originating and terminating stations belong to the same mobile network (though they may use parts of the public telephone network as trunk lines), the process of determining a routing at the originating exchange will also determine that conversion to telephony standard coding is not required.

It should be noted that it is not necessary to identify 100% of calls which are potential beneficiaries of the more efficient strategy. There would be no deleterious effects on any call which failed to be so identified. The call would be handled as if the invention had not been implemented. The benefit to the end-users of less transmission delay, and the advantage to the network of more efficient usage of resources, would accrue on those calls which can be identified.

Further description of signalling systems is given in Chapter 20, "Common-channel signalling", pages 400–428 (see especially pages 408 and 423–425) of "SPC Digital Exchanges" by F. J. Redmill and A. R. Valdar, published by Peter Peregrinus Limited on behalf of the Institution of Electrical Engineers, London in 1990.

In general terms, the advantages of the invention just described become particularly relevant when ATM has achieved good penetration in telephony networks and in particular the PSTN. It will also be appreciated that while the foregoing description has been given with regard to GSM coding of the original speech data that the present invention is equally applicable to DECT coding and for the purposes of this specification a DECT-standard cordless phone working to a suitable in-house base station counts as a mobile phone.

I claim:

1. A speech transmission system, comprising:

a public network having a plurality of nodes where speech signal transmission between at least two of the nodes is via a predetermined telephony standard;

a plurality of mobile stations, each operative for transmitting and receiving a speech signal over radio links;

a plurality of base stations, each operative for communicating with the mobile stations, and for analyzing the speech signal into data strings of predetermined length from which the speech signal can be reconstituted;

a mobile switching center in communication with the base stations and the network; and an interface between each base station and the mobile switching center, said interface being operative for packetizing the data strings for transmission to a recipient one of the nodes of the network without conversion to said predetermined telephony standard if said recipient one node can reconstitute the speech signal directly from the data strings.

2. The system as claimed in claim 1, including means in the system for converting the data strings to said predetermined telephony standard upon inability of said recipient one node to reconstitute the speech signal directly from the data strings.

3. A speech transmission system, comprising:

a public network having a plurality of directly connected nodes where speech signal transmission between said directly connected nodes is normally by a predetermined telephony standard and where said directly connected nodes include a plurality of mobile switching centers;

a plurality of base stations, each connected to one of said mobile switching centers and each operative for communicating with at least one cordless telephone over a radio link;

each base station further being operative for analyzing a speech signal received from a cordless telephone into data strings of predetermined length from which the speech signal can be reconstituted; and an interface between each base station and said connected mobile switching center, said interface being operative for packetizing said data strings for transmission from said connected mobile switching center to a further one of the plurality of directly connected nodes without conversion to said predetermined telephony standard if said further one of the plurality of directly connected nodes can reconstitute the speech signal directly from the data strings.

4. The speech transmission system as claimed in claim 3, including means in the system for converting the data strings to said predetermined telephony standard upon inability of said further one of the plurality of directly connected nodes to reconstitute the speech signal directly from the data strings.

5. The speech transmission system as claimed in claim 3, wherein the packetized data strings are transmitted in ATM cells.

6. The speech transmission system as claimed in claim 3, wherein the further one of the plurality of directly connected nodes is a further one of the plurality of mobile switching centers.

\* \* \* \* \*